Jan. 13, 1953　　　W. J. SPARKS ET AL　　　2,625,538
CONTROLLED POLYMERIZATION PROCESS
Filed June 8, 1951
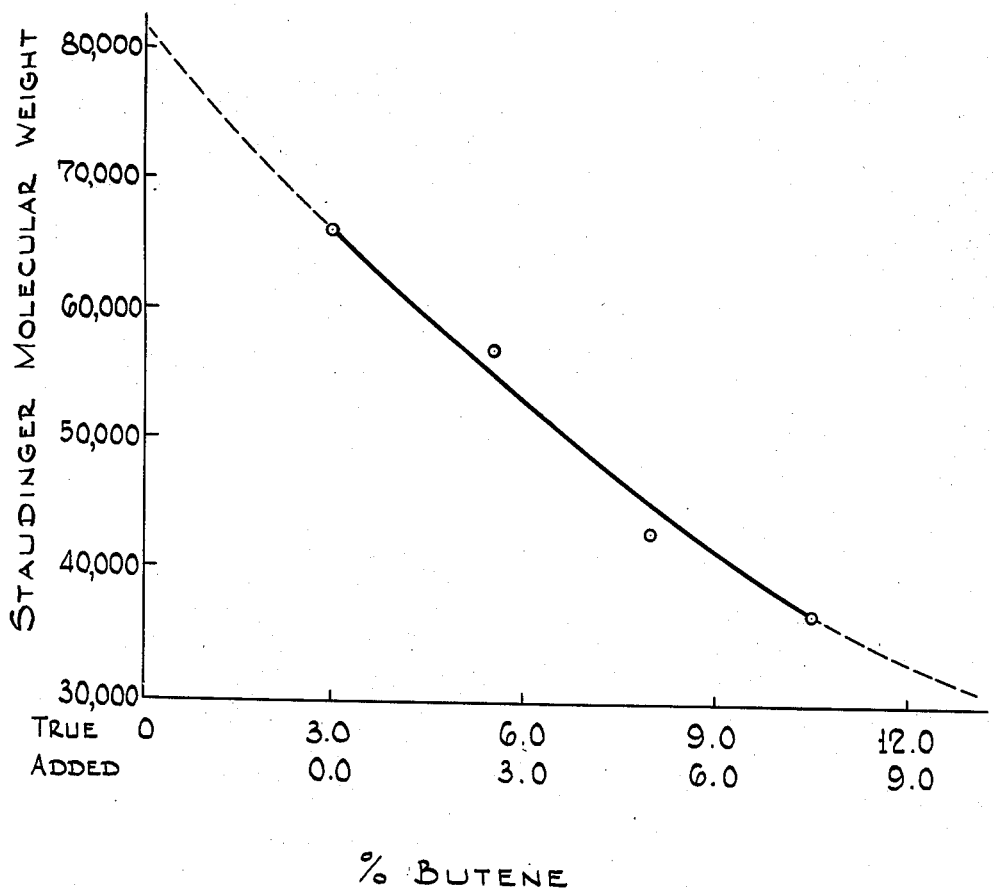
William J. Sparks
Joseph F. Nelson　Inventors
By W. H. Smyers　Attorney Patented Jan. 13, 1953

2,625,538

UNITED STATES PATENT OFFICE 2,625,538

CONTROLLED POLYMERIZATION PROCESS

William J. Sparks, Westfield, and Joseph F. Nelson, Clark Township, Union County, N. J., assignors to Standard Oil Development Company, a corporation of Delaware Application June 8, 1951, Serial No. 230,648

14 Claims. (Cl. 260—85.3)

This application relates to copolymers of isoolefins with diolefins and their preparation and relates especially to novel means for controlling the degree of polymerization, thereby obtaining olefinic copolymers having optimum plasticity for convenient processing and curing to good tensile strength.

It is well known in the art to make a synthetic rubber, as shown in U. S. Patent 2,356,128 by Thomas and Sparks by interpolymerizing an isoolefin such as isobutylene with a polyolefin such as butadiene, isoprene, piperylene, dimethylbutadiene, and the like, at temperatures ranging from —40 to —164° C. by the application to the olefinic mixture of a dissolved Friedel-Crafts catalyst to yield a polymer having Staudinger molecular weights ranging from about 20,000 up to 150,000 or higher. Such polymers are reactive with vulcanizing agents such as sulfur and various other curing compounds in a reaction which removes from the polymer the property of cold flow and develops in the material a definite elastic limit, a high tensile strength, a good abrasion and flex resistance as well as other valuable physical properties.

This material is fabricated in much the same manner in which natural rubber is fabricated. Such fabrication requires a considerable amount of processing and extruding. In general, the ease with which such processing can be carried out is found to be a function of the plasticity of the material. Rubbery material having a Williams plasticity above about 195, or a Mooney viscosity above about 75 is so tough as to be extremely difficult to process on the mill or in the extruder. Consequently, material having such a plasticity value is frequently undesirable because of the high power demands for processing, the difficulty of making the material "band" on the mill, and the extreme difficulty of getting smooth extrusion products. Material having a Williams plasticity between 100 and 195, or a Mooney viscosity within the range between 35 and 75 is quite easy to process, since it works easily on the mill, bands readily, extrudes smoothly and rapidly and requires a minimum of power for the processing. Material having a Williams plasticity below about 100 or a Mooney viscosity below about 35, sticks to the mill, and, when cured, usually has a poor tensile strength. Thus, there is a critical range of plasticity and viscosity limits for these rubbery products.

Furthermore, it is found that the Williams plasticity and Mooney viscosity are functions both of the average molecular weight, and the molecular weight range of the material. Material having an average molecular weight below about 20,000 is semi-liquid. Material having an average molecular weight from about 20,000 up to about 28,000, has a Williams plasticity below about 100 and a Mooney viscosity below 35, without regard to the molecular weight range. Material having an average molecular weight above about 28,000, up to about 75,000, and a moderately narrow molecular weight range, has a Williams plasticity range between 100 and about 195 and a Mooney viscosity within the range between 35 and 75. Material having an average molecular weight above about 75,000 has a Williams plasticity above 195 and a Mooney viscosity above 75. It is thus preferable to limit the molecular weight of the polymers to the range of 30,000 to 75,000.

In the past, the value of the molecular weight and, correspondingly, the Williams plasticity and Mooney viscosity, have been found to depend on a number of factors. These characteristics are functions of the temperature at which the polymerization is conducted, the purity of the raw materials and the potency of the catalyst employed. Great difficulty has been encountered in controlling these factors sufficiently well to obtain consistently a polymer having the desired plasticity and the desired molecular weight range. Uniformity of production is very desirable in a commercial operation.

For instance, the molecular weight may be decreased and plasticity increased by polymerization at a higher temperature, but an increase in reaction temperature is undesirable since it makes the polymerization process difficult to operate because of the increased coagulation of the slurry of polymer occurring in the reaction liquid. Likewise, it is desirable that materials of high purity be used, since the uncontrolled presence of unknown impurities causes a wholly unpredictable and uncontrollable variation in molecular weight. Also, the most potent possible catalyst is desirable, since catalysts of lower potency yield materials which are undesirable in many ways.

The instant application is a continuation-in-part of application Serial No. 525,590, filed March 8, 1944, and abandoned September 10, 1951.

The present invention is based upon the discovery that it is possible to control the plasticity by control of the molecular weight and the range of molecular weight by the steps of purifying the olefins to a high degree of purity, operating at a comparatively very low temperature with a highly potent catalyst, and simultaneously controlling the reaction by the use of particular modifiers, specifically normal mono-olefins of four to eight carbon atoms and branched mono-olefins of five to eight carbon atoms, in the reaction mixture. These olefin modifiers have the effect of limiting the maximum molecular weight obtainable to bring the plasticity within the desired range of values.

For this purpose it is desirable that low temperatures, such as from —60° to —103° C., be used with olefinic reactant material of high purity. Preferably, there is used isobutylene having a purity of from 96 to 98% or better and di-olefins having a purity from 86 to 99% or better. Small amounts, ranging from 0.001% to 15%, and preferably 1% to 10%, of the modifying olefins, based on the olefin reactants used, are present in the reaction mixture for best results in controlling molecular weight. The modifying material is either a normal or branched-chain olefin hydrocarbon. Branched-chain mono-olefins such as diisobutylene, octene, or tri-isobutylene, and the like, are effective. However, the preferred molecular weight range is from 4 to 8 carbon atoms. Normal mono-olefins having from 4 to 8 carbon atoms such as the normal butenes, normal amylenes, and the like, are especially effective, 1-butene and 2-butene being the preferred modifiers. The isoolefins of higher molecular weight than isobutylene act as modifiers when added to the isobutylene-containing reactant mixture. In general, by the term "modifier" it is intended to include monoolefins of four to eight carbon atoms having substantially lower tendencies to polymerize under the specified reactant conditions than has isobutylene.

The reaction is conducted by the application to the reaction mixture of a dissolved Friedel-Crafts catalyst, in solution in a low-freezing, non-complex-forming solvent. The resulting polymerization, when modified by the process of this invention, yields a polymer having satisfactory plasticity and molecular weight properties which permit its ready cure to yield a vulcanized material of high tensile strength. In addition, the polymer is readily milled, extruded and otherwise processed.

In practicing the invention, the olefinic polymerization mixture is prepared using isobutylene. The isoolefin reactant is preferably used in major proportion with a minor proportion of a polyolefin such as butadiene, isoprene, piperylene, or dimethyl butadiene or the tri-olefin, myrcene, or di-methallyl or the like, the polyolefins having from 4 to 8 and up to 14 carbon atoms per molecule. The preferred polyolefin is a conjugated diolefin having from 4 to 8 carbon atoms. The preferred proportions of olefinic reactants are from 75 to 99% of isobutylene with from 25 to 1% of polyolefin, based on the isobutylene used. In the case where butadiene is employed, the ratios of polyolefin to isobutylene can be greatly increased over a wide range. Thus, a ratio of 2 parts of butadiene to 1 part of isobutylene can be employed to get a very highly unsaturated polymer. The olefinic reactant material with the modifier is cooled to a temperature below —40° C., preferably within the range of —60° C. to —103° C., although the temperature may be brought as low as —164° C. The low temperature may be obtained by the addition of an appropriate internal refrigerant such as solid carbon dioxide or liquid methane or liquid ethylene or liquid ethane or even liquid propane directly to the reaction mixture; or the material may be cooled externally by a refrigerating jacket containing similar refrigerants applied to the reactor.

The useful catalysts are the Friedel-Crafts type polymerization catalysts employed in solution. Of these catalysts, boron fluoride and the aluminum halides and, especially aluminum chloride and aluminum bromide, are preferred. Other catalysts include the titanium and uranium halides, zirconium tetrachloride, all the Friedel-Crafts catalysts being effective but functioning with varying power and efficiency. These catalysts may also be modified in various ways to yield double salts or hydrates or the like which are also of high catalytic potency.

The Friedel-Crafts catalyst is preferably dissolved in a suitable solvent such as carbon disulfide, ethyl or methyl chloride, or a hydrocarbon such as butane in the case of aluminum bromide. Any of the mono or poly alkyl halides having up to 4 or 5 carbon atoms are useful, depending upon the freezing point which necessarily is below 0° C. It is necessary also that the solvent should not form a complex with the Friedel-Crafts substance, and should leave substantially none of the solvent attached to or combined with the Friedel-Crafts substance when the used catalyst solution is subjected to distillation.

It is not known precisely how the modifier compound functions. In some cases, it may be an effect of the modifier adding to the polymer chain to terminate chain growth. The modifier may also show its effect as a result of complexing with the catalyst. The poisoning effect of the diolefin is also operating at the same time as the modifier is showing its effect. Generally, the more diolefin present in the liquid reaction mixture, the less modifier compound will be required for practical control of the molecular weight.

To carry out the invention, there is added to the olefinic reactant materials an appropriate amount of the modifier material, amounts ranging from 0.001% based on the amount of reactants to approximately 15%, with 1% to 10% being the preferred range. Or, one convenient and practical operating method is to let a small amount of n-butenes normally present in the fresh isobutylene feed accumulate in a recycle operation to the desired level and then to purge unreacted butenes from the system at a rate to maintain the desired level of n-butenes. No provisions for purging would give a product having too low a molecular weight.

In the preparation of the polymerization mixture, it is desirable, although not absolutely necessary, that the mixture be diluted with an appropriate diluent or diluent refrigerant. When the mixture is cooled by admixed liquid ethylene, it serves simultaneously as diluent and refrigerant. Alternatively, and especially when a refrigerating jacket with external cooling is used, the material may, if desired, be diluted with such substances as methyl or ethyl chloride, n-butane, and some other saturated hydrocarbons which are liquid at the reaction temperature.

When the reaction mixture is completely prepared with the modifier compound present, the reaction is conducted by adding the dissolved catalyst to the cold rapidly stirred olefinic reactant material. The catalyst solution may be delivered to the reaction mixture in any convenient way which provides a rapid dispersal of the catalyst solution into the body of the reaction mixture. For instance, the dissolved catalyst solution may be delivered through a jet into the bottom of the rapidly stirred reaction mixture; or the materials may be combined together in a high turbulence zone such as the eddy zone adjacent to a propeller stirrer, or into a rapidly flowing stream of material, or by spraying, or the like.

The reaction proceeds rapidly to yield the desired polymer having a plasticity and molecular weight which is readily adjusted, by the amount of the modifier present, to have a Williams plasticity between 100 and 195, a Mooney viscosity between 35 and 75; and an average molecular weight between 30,000 and approximately 75,000, the best results usually being obtained with polymers having molecular weights of 35,000 to 75,000.

As to the olefins which can be used, substantially all of the normal mono-olefins having from 4 up to a maximum of about 16 carbon atoms per molecule are useful, the principal requirement being that they be soluble in the reaction mixture in amounts greater than about 0.001%. It is also found that the iso-olefins which are less easily polymerizable than isobutylene are effective as modifiers, particularly those having from 5 to 8 carbon atoms per molecule.

When the reaction has reached the desired stage of completion it may be quenched by emptying the reactor contents into warm naphtha containing small amounts of alcohol or into warm water or warm soda solution or warm dilute aqueous alcohol or the like, to drive off volatile materials and inactivate the catalyst; or the reaction may be allowed to complete itself before recovering the polymer. The solid polymer may then be milled, and, if desired, washed on the mill to remove as much as possible of the catalyst and free the material entirely from dissolved volatile substances. The material may then be compounded with pigments, sulfur and sulfurization aids or other curing agents and cured at appropriate temperatures for appropriate times to yield the desired fabricated products.

The following examples are presented as typical to illustrate the invention although it is not intended to limit the invention specifically thereto.

EXAMPLE 1

A mixture was prepared consisting of 1480 parts by volume of isobutylene of 96% purity, 21 parts of isoprene of 93% purity, and 2700 parts of methyl chloride of approximately 99% to 99.7% purity. The impurities present in the isobutylene include a certain amount of $C_4$ saturates and n-butenes. The mixture was placed in a storage container having a refrigerating jacket, filled with liquid ethylene. The refrigerant brought the temperature of the mixture down to approximately −100° C. A portion, approximately 1/3 of the mixture, was transferred to a refrigerant jacketed reactor and polymerized, without modification, by application to the rapidly stirred solution of olefinic material in methyl chloride of approximately 120 parts, per 1000 parts of polymerization mixture, of a solution of aluminum chloride in methyl chloride having a concentration of 0.2%; the catalyst solution being applied in the form of a fine spray onto the surface of the separately stirred polymerization material.

A second portion of 1400 parts was taken and approximately 0.7 part of diisobutylene per 1400 of reaction mixture were added to the solution of olefinic material in methyl chloride and well stirred into the mixture. 200 parts of the same catalyst solution were similarly applied to the second portion for a second polymerization.

To the third portion there was then added 1.05 parts of diisobutylene instead of the 0.7 part as with batch 2, and portion 3 was then polymerized in the same manner as portions 1 and 2.

All three portions were polymerized to approximately 60% yield and then emptied into warm water. Each portion of solid polymer was then removed from the warm water and the batches were separately washed and dried on the mill. The three portions were each separately compounded according to the following recipe:

| | Parts |
|---|---|
| Polymer | 100 |
| Carbon black | 10 |
| Stearic acid | 3 |
| Zinc oxide | 5 |
| Sulfur | 1.5 |
| TUADS (tetra methyl thiuram disulfide) | 1 |

A part of each portion was cured at a temperature of 307° F., for a time interval of 60 minutes while another portion of each batch of uncompounded polymer was used for the determination of plasticity according to the Williams system. Test samples were cut from the cured portions for the determination of tensile strength, and molecular weight was determined in uncompounded samples by the Staudinger Viscosity Method. The inspection results are shown in the following Table I:

*Table I*

| Portion number | Weight percent di-isobutylene | Staudinger molecular weight | Williams plasticity | | Tensile strength |
|---|---|---|---|---|---|
| | | | Plasticity | Recover | |
| 1 | 0.0 | 74,000 | 202 | 38 | 3,730 |
| 2 | 0.7 | 45,000 | 138 | 16 | 3,410 |
| 3 | 1.05 | 35,500 | 114 | 6 | 3,170 |

These inspection results show the very great gain in plasticity obtainable by the reduction in molecular weight, and show the minor loss only of tensile strength. It should be noted that the chief impurities present in the 96% isobutylene are $C_4$ saturates and n-butenes. Thus, the n-butenes present exert some effect on the molecular weight in addition to the effect exerted by the added diisobutylene. Thus, had isobutylene completely free of butenes been used, the molecular weight obtained when no diisobutylene was added, would have been substantially above 74,000. This effect is apparent from the description and figure of Example 2.

Other determinations on similar samples show that portion 1 with the 74,000 molecular weight extrudes with difficulty and the extruded material is somewhat unsatisfactory, indicating that this is about the maximum molecular weight for useful polymer. In contrast, the 45,000 molecular weight shows reasonably good extrusion properties, the extruded sample being relatively smooth and of reasonably accurate size. The third portion of 35,500 molecular weight shows very good extrudability, a close size, a very smooth finish, and a high rate of extrusion. Thus, the second and third portions are highly desirable for extruded tubing; tire inner tubes; and extruded tread stock as well as calendered goods generally.

EXAMPLE 2

A mixture was prepared consisting of 160 parts by weight of isobutylene of 96% purity, 5 parts by weight of isoprene of 93% purity, and 1000 parts by weight of methyl chloride of 99 to 99.7% purity. This mixture was cooled, as in Example 1, to a temperature of approximately −100° C. and successive portions were polymerized at that temperature by the addition of approximately 100 parts by weight of a solution of aluminum chloride in methyl chloride having a concentration of 0.2%, as in Example 1. The mixture was divided up into four portions, and as each portion was prepared for polymerization, it was treated with 2-butene as shown in Table II; the first portion containing no added 2-butene, the second portion containing 2.5% of 2-butene, the third portion, 5% of 2-butene and the fourth portion 7.5% of 2-butene based on the olefins present. These successive portions were then polymerized, as in Example 1, and the Williams plasticity determined on the uncured materials to yield the values shown in Table II below. The respective polymers were then compounded according to the recipe in Example 1, cured, as in Example 1, and the tensile strength determined to yield the results shown in Table II. These results clearly show the effectiveness of the present treatment in bringing the Williams plasticity value within the desired range, without sacrifice of tensile strength or other valuable properties.

*Table II*

| Portions | Weight percent 2-butene added | Tensile strength | Staudinger molecular weight | Williams plasticity | |
|---|---|---|---|---|---|
| | | | | Plasticity | Recovery |
| 1 | 0 | 3,600 | 66,000 | 180 | 36 |
| 2 | 2.5 | 3,390 | 57,000 | 155 | 24 |
| 3 | 5 | 3,285 | 43,000 | 110 | 14 |
| 4 | 7.5 | 3,200 | 37,000 | 108 | 5 |

The above table and the effects of the added 2-butene are best understood when considered in conjunction with the accompanying figure. These figures show the results obtained when the Staudinger molecular weight values are plotted against the amount of added 2-butene and the corresponding actual amounts of total n-butenes present. The values corresponding to the actual amounts thus take into account the effect on molecular weight which is exerted by the presence of a constant amount of n-butenes in the 96% isobutylene used. The curve, so obtained, when extended to show the molecular weight value of a product prepared in the presence of zero per cent of butene, indicates that the Staudinger molecular weight of the polymer would be at least 80,000, giving a tough product of difficult processibility.

EXAMPLE 3

A second series of runs similar to that described in Example 2 was carried out. The results are tabulated in Table III, and show the improvement in molecular weight obtained when varying amounts of 2-butene were added to the reaction mixture. A further advantage is to be noted in that there is no loss in good physical characteristics of the product upon curing. In this case also a 96% isobutylene was employed, one of the impurities being a certain amount of n-butenes.

*Table III.—The effect of 2-butene on the preparation of isoolefin-diolefin copolymer*

| Run No. | Weight percent 2-butene added | Conversion, percent | Staudinger mol. wt. | Mol. percent unsat. | 10 parts channel black cure | | | |
|---|---|---|---|---|---|---|---|---|
| | | | | | Tensile | | Elongation | |
| | | | | | 30′ | 60′ | 30′ | 60′ |
| 1 | 0 | 71.0 | 67,000 | 0.88 | 3,800 | 3,900 | 960 | 900 |
| 2 | 2.5 | 59.0 | 54,000 | .83 | 3,700 | 3,850 | 1,000 | 920 |
| 3 | 10.0 | 30.0 | 38,000 | .75 | 3,500 | 3,750 | 970 | 960 |

EXAMPLE 4

A similar mixture to that used in Example 2 was prepared, divided into five portions, and successive portions treated with 0%, 1%, 2.5%, 5%, and 10% of 1-butene. In this instance a purer isobutylene containing less butenes was employed. The several portions were then separated, polymerized, as in Examples 1 and 3, and the molecular weights of the polymers and Williams plasticity values determined, as shown in Table IV. The polymers were then separately compounded according to the recipe of Example 1, cured for 40 minutes and 60 minutes at 153° C. to yield the tensile strengths shown in Table IV.

*Table IV*

| Run No. | Weight percent 1-butene | Staudinger molecular weight | Tensile | | Mooney viscosity |
|---|---|---|---|---|---|
| | | | 40′ cure | 60′ cure | |
| 4 | 0.0 | 87,000 | 3,700 | 3,550 | 82 |
| 5 | 1.0 | 77,000 | 3,850 | 3,650 | 80 |
| 6 | 2.5 | 70,000 | 2,850 | 2,850 | 68 |
| 7 | 5.0 | 53,000 | 3,250 | 3,500 | 51 |
| 8 | 10.0 | 49,000 | 3,450 | 3,150 | 45 |

The preferred modifiers are the n-butenes. 1-butene is particularly employed in commercial operations. 1-butene is less potent than 2-butene, which, in turn, is less potent than trimethyl ethylene. In general, it is better to use the less potent modifiers. They lead to easier plant operations since small changes in concentration are not critical.

EXAMPLE 5

A series similar to that described in Example 4 was carried out using 1-butene as the modifier. The results are presented in tabular form in Table V and show the advantages in product quality obtained.

*Table V.—The effect of 1-butene on the preparation of polymer*

| Run No. | Volume percent of 1-butene | Conversion, percent | Catalyst efficiency, g. polymer/g. $AlCl_3$ | Staudinger mol. wt. | Mol. percent unsat. | 10 parts channel black cure | | | |
|---|---|---|---|---|---|---|---|---|---|
| | | | | | | Tensile | | Elongation | |
| | | | | | | 20′ | 40′ | 20′ | 40′ |
| 9 | 0 | 51 | 1,855 | 88,000 | 1.23 | 3,750 | 3,800 | 910 | 830 |
| 10 | 0 | 8.7 | 475 | 86,000 | 1.23 | | | | |
| 11 | 0 | 9.2 | 335 | 88,000 | .99 | | | | |
| 12 | 2.5 | 15.7 | 722 | 78,000 | 1.21 | | 3,750 | | 890 |
| 13 | 2.5 | 7.7 | 306 | 77,000 | 1.36 | | | | |
| 14 | 2.5 | 5.8 | 206 | 76,000 | 1.05 | | | | |
| 15 | 5.0 | 37.8 | 1,000 | 68,000 | 1.05 | 3,450 | 3,750 | 950 | 860 |
| 16 | 5.0 | 2.2 | 86 | 66,000 | .93 | | | | |
| 17 | 5.0 | 12.5 | 359 | 64,000 | .99 | | | | |
| 18 | 7.5 | 18.9 | 312 | 59,000 | .99 | | 3,550 | | 890 |
| 19 | 7.5 | 16.9 | 419 | 58,000 | .99 | | | | |
| 20 | 10.0 | 15.7 | 340 | 54,000 | .98 | | 3,500 | | 880 |
| 21 | 10.0 | 24.4 | 493 | 52,000 | 1.06 | | | | |

EXAMPLE 6

A mixture was prepared consisting of 1200 parts by volume of methyl chloride, 99 to 99.7% pure, 300 parts by volume of isobutylene of 96% purity, and 5.4 parts by volume of isoprene of 93% purity. This mixture was cooled by a refrigerating jacket on the container having liquid ethylene therein, bringing the temperature to approximately −100° C. Three separate portions of this mixture were separately polymerized by the addition of approximately 100 parts by volume per 1500 parts of reaction mixture of a solution of aluminum chloride in methyl chloride having a concentration of 0.3%. The catalyst was applied in the form of a fine spray onto the surface of the rapidly stirred reaction mixture. The first portion contained no modifier. The second portion contained 2.5 parts of trimethyl ethylene per 100 parts by volume of isobutylene in the reaction mixture, and the third portion contained 5 parts by volume of trimethyl ethylene per 100 parts of isobutylene in the mixture. The several polymerization mixtures after polymerization to approximately 70% yield were emptied into warm water to flash off the methyl chloride and unreacted olefins and quench the polymerization. Molecular weights and Williams Plasticity values for the respective portions of polymer were determined, as shown in Table VI. The apparent low molecular weight of product obtained when no trimethylethylene was used reflects the effect of normal olefins present as impurity in the reactant materials, as well as a low degree of catalyst activity.

*Table VI*

| Run No. | Weight percent trimethylethylene added based on isobutylene | Staudinger molecular weight | Williams plasticity |
| --- | --- | --- | --- |
| 22 | 0.0 | 56,000 | 160 |
| 23 | 2.8 | 34,000 | 108 |
| 24 | 5.6 | 25,000 | 95 |

These results show clearly the effectiveness of the olefinic modifiers and the utility of the results obtained thereby in the way of plasticity, ease of extrusion, ease of calendering and good tensile strength. These polymers likewise show very high abrasion resistance, very high flex resistance and advantageously low heat build-up as well as a high resistance to oxygen and breakdown from ozone and other influences.

Thus the process of the invention improves the calendering, extruding and processing properties of a rubber-like olefinic polymer while retaining the advantageous tensile strength and other valuable properties of the polymer as well as its ready curability.

It is further within the contemplation of the process of this invention to use mixed modifiers, said mixtures consisting of varying proportions of the types of mono-olefins which exert a controlling influence on the molecular weight. As a typical example, mixtures of n-butenes would be quite satisfactory when employed according to the process of this invention.

What is claimed is:

1. In a polymerization process for the polymerization of mixtures of isobutylene with a conjugated diolefin having from 4 to 6 carbon atoms per molecule at temperatures ranging from −40° to −164° C. by the application thereto of a dissolved Friedel-Crafts catalyst, the step of modifying the course of the polymerization and thereby controlling the molecular weight characteristics of the polymer product by carrying out the polymerization in the presence of controlled amounts of from .001% to 15% by weight, based on the polymerizable olefins, of a modifier consisting of a mono-olefin having from 4 to 16 carbon atoms per molecule and having a lower tendency to polymerize than does isobutylene.

2. In a polymerization process for the polymerization of mixtures of isobutylene with a conjugated diolefin having from 4 to 6 carbon atoms per molecule at temperatures ranging from −40° to −164° C. by the application thereto of a dissolved Friedel-Crafts catalyst, the step of modifying the course of the polymerization and thereby controlling the molecular weight characteristics of the polymer product by carrying out the polymerization in the presence of controlled amounts of from .001% to 15% by weight, based on the polymerizable olefins, of a modifier selected from the group consisting of normal mono-olefins having from 4 to 8 carbon atoms per molecule and branched chain mono-olefins having from 5 to 8 carbon atoms per molecule.

3. In a polymerization process for the polymerization of mixtures of major proportions of isobutylene with minor proportions of a conjugated diolefin having from 4 to 6 carbon atoms per molecule at temperatures ranging from −60° to −103° C. by the application thereto of a dissolved Friedel-Crafts catalyst, the step of modifying the course of the polymerization and thereby controlling the molecular weight characteristics of the polymer product by the addition thereto of from .001% to 15% by weight, based on the polymerizable olefins, of a modifier selected from the group consisting of normal mono-olefins having from 4 to 8 carbon atoms per molecule and branched chain mono-olefins having from 5 to 8 carbon atoms per molecule.

4. In a polymerization process for the copolymerization of mixtures of major proportions of isobutylene with minor proportions of a conjugated diolefin having from 4 to 6 carbon atoms per molecule at temperatures within the range from −60° to −103° C. by the application thereto of a Friedel-Crafts catalyst in solution in a low-freezing, non-complex-forming solvent, the step of modifying the course of the polymerization by the addition thereto of from .001% to 10% by weight, based on the polymerizable olefins, of a modifier consisting of n-butenes.

5. A process according to that described in claim 4 in which the n-butenes consist substantially of 1-butene.

6. A process according to that described in claim 4 in which the n-butenes consist substantially of 2-butene.

7. In a polymerization process for the copolymerization of mixtures of major proportions of isobutylene with minor proportions of isoprene at temperatures within the range from −60° to −103° C., by the application thereto of a Friedel-Crafts catalyst in solution in a low-freezing, non-complex-forming solvent, the step of modifying the course of the polymerization by the addition thereto of from .001% to 10% by weight, based on the polymerizable olefins, of a modifier consisting of n-butenes.

8. A process according to that described in claim 7 in which the n-butenes consist substantially of 1-butene.

9. A process according to that described in claim 7 in which the n-butenes consist substantially of 2-butene.

10. In a polymerization process for the copolymerization of mixtures of major proportions of isobutylene with minor proportions of butadiene at temperatures within the range from −60° to −103° C. by the application thereto of a Friedel-Crafts catalyst in solution in a low-freezing, non-complex-forming solvent, the step of modifying the course of the polymerization by the addition thereto of from .001% to 10% by weight, based on the polymerizable olefins, of a modifier consisting of n-butenes.

11. A process according to that described in claim 10 in which the n-butenes consist substantially of 1-butene.

12. A process according to that described in claim 10 in which the n-butenes consist substantially of 2-butene.

13. In a polymerization process for the polymerization of a mixture containing a major proportion of isobutylene and a minor proportion of isoprene, and diluted with methyl chloride at temperatures ranging from −60° to −103° C., by the application thereto of a solution of aluminum chloride in methyl chloride as polymerization catalyst, the step of modifying the course of the polymerization and thereby controlling the molecular weight characteristics of the polymer product by the addition thereto of from 1.0% to 10% by weight, based on the polymerizable olefins, of 2-butene.

14. In a polymerization process for the polymerization of a mixture containing a major proportion of isobutylene and a minor proportion of isoprene, and diluted with methyl chloride at temperatures ranging from −70° to −103° C., by the application thereto of a solution of aluminum chloride in methyl chloride as polymerization catalyst, the step of modifying the course of the polymerization and thereby controlling the molecular weight characteristics of the polymer product by the addition thereto of from 1% to 10% by weight, based on the polymerizable olefins of 1-butene.

WILLIAM J. SPARKS.
JOSEPH F. NELSON.

REFERENCES CITED

The following references are of record in the file of this patent:

UNITED STATES PATENTS

| Number | Name | Date |
|---|---|---|
| 2,356,128 | Thomas | Aug. 22, 1944 |
| 2,399,672 | Green | May 7, 1946 |